2,853,462
Patented Sept. 23, 1958

2,853,462

ADDITION COPOLYMERS OF ALLYLOXYALKANOLS, LOWER ALKENOIC ACIDS, AND ALKYL LOWER ALKENOATES, AND METHOD OF MAKING

Norman G. Gaylord, Westbury, N. Y., assignor to Interchemical Corporation, New York, N. Y., a corporation of Ohio No Drawing. Application May 28, 1956
Serial No. 587,479

5 Claims. (Cl. 260—45.2)

This invention relates to new polymeric materials and to coating compositions containing these new polymers. More particularly the invention relates to new addition type polymerization products that are compatible with organic solvent soluble thermosetting urea-formaldehyde and melamine-formaldehyde resins and reactive with these thermosetting aminoplast resins to form homogeneous clear films.

The new resins are copolymers of an allyloxy alkanol, acrylic or methacrylic acid, and at least one ester of acrylic or methacrylic acid with an aliphatic monohydric alcohol having 1 to 8 carbon atoms. Preferably the copolymers contain both an acrylic acid ester and a methacrylic acid ester. The new resins contain 5 to 30 parts of an allyloxy alkanol and 5 to 15 parts of acrylic or methacrylic acid for each 100 parts of acrylate type ester. In the preferred resins the acrylate type ester will consist of 25 to 75% acrylate ester and 25 to 75% methacrylate ester. Minor amounts of other copolymerizable monomers may be included in making the resins provided these other monomers do not constitute more than about 20% the total resins. Typical additional reactants include: acrylonitrile, bis ethylene glycol maleate, dimethyl maleate, dimethyl fumarate, and vinyl butyl ether.

The new coating compositions of the present invention comprise coating compositions whose resinous film forming component comprises organic solvent soluble heat reactive aminoplast resin and the new copolymers defined hereinabove.

In the preparation of the new copolymers of the present invention, I may use, as the acrylic acid ester, methyl acrylate, ethyl acrylate, butyl acrylate, 2-ethyl hexyl acrylate or, in general, acrylic acid esters of alcohols containing 1 to 8 carbon atoms. Similarly, for the methacrylic acid ester, I may use methyl methacrylate, ethyl methacrylate, butyl methacrylate, 2-ethyl hexyl methacrylate or, in general, any methacrylic acid ester of an alcohol containing 1 to 8 carbon atoms.

The allyloxy alkanol used as one of the monomers in making the new copolymers is a mono allyl ether of a glycol containing 2 to 20 carbon atoms. The glycol may be straight chain or branched chain. These ethers are readily prepared by reacting allyl chloride with the monosodium derivative of the desired glycol.

The new copolymers made in accordance with the present invention can be represented as containing the following structural units:

(A)

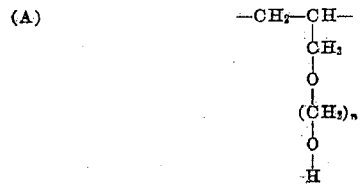

from the allyloxy alkanol, where n is an integer from 2 to 20

(B) 

from acrylic acid and methacrylic acid, i. e. where R is H or $CH_3$ (C) 

from the acrylate type ester, where R is H or $CH_3$ and R' is an alkyl group containing 1 to 8 carbon atoms.

It will be understood that the new copolymers do not contain the structural groupings A, B and C in equal amounts but, as indicated hereinabove, in the ratio of 5 to 30 parts of A and 5 to 15 parts of B for each 100 parts of C. The acrylate ester type unit being the most prevalent, the copolymer could be generally described as a modified acrylate type polymer.

The new polymers are made in conventional manner, for example, by mixing all of the reactants in a volatile solvent and heating with a free radical forming catalyst. Substantially 100% conversion of the monomers to soluble polymer is obtained. Typical examples of copolymers made in accordance with the invention are illustrated in the following examples:

Example 1

A solution of 38 g. of allyloxyethanol in 124 g. of xylene is placed in a 3-necked flask equipped with a stirrer, thermometer, dropping funnel and condenser. A solution of 70 g. methyl methacrylate, 130 g. of butyl acrylate, 10 g. of methacrylic acid and 4.96 g. of benzoyl peroxide in 124 g. of xylene is added dropwise over four hours while maintaining the temperature at 80° C. When the addition is complete the reaction mixture is heated for an additional eight hours. A sample subjected to 150° C. at atmospheric pressure for 30 minutes, followed by 30 minutes at 2 mm. pressure shows 49% solids, indicating 98% conversion.

The resin solution is blended with an organic solvent soluble, thermosetting melamine formaldehyde resin (Uformite MX–61) in a 6:4 weight ratio (6 parts of copolymer resin to 4 parts of melamine resin) on a solids basis and drawn down on a steel panel. After baking at 350° F. for 30 minutes a cured, tough, flexible film is obtained.

Example 2

A solution of 70 g. of methyl methacrylate, 130 g. of butyl acrylate, 10 g. of methacrylic acid and 4.6 g. of benzoyl peroxide in 115 g. of xylene is added slowly over a period of four hours to a solution of 19 g. of allyloxyethanol in 115 g. of xylene. The reaction mixture is stirred and maintained at 80° C. during the addition and then for an additional eight hours. A sample subjected to 150° C. at 760 mm. for 30 minutes and 150° C. at 2 mm. for 30 minutes shows 49.5% solids indicating 99% conversion.

The resin solution is blended with an organic solvent soluble, thermosetting melamine resin in a 6:4 weight ratio on a solids basis and flowed out and baked on a steel panel for 30 minutes at 350° F. to yield a cured flexible film that is hard and tough.

Example 3

A solution of 70 g. of methyl methacrylate, 130 g. of butyl acrylate, 10 g. of methacrylic acid and 5.2 g. of benzoyl peroxide in 130 g. of xylene is added slowly over a period of four hours to a solution of 50 g. of allyloxyethanol in 130 g. of xylene. The reaction mixture is stirred and maintained at 80° C. during the addition and then for an additional eight hours. A solids determination, as described in the earlier examples, shows 45% solids indicating 90% conversion. The reaction mixture is heated for an additional 7 hours at 80° C. to yield a 46% solids solution indicating 92% conversion.

The resin solution is blended with an organic solvent soluble, thermosetting melamine resin and baked at 350° F. for 30 minutes to yield a flexible cured film.

*Example 4*

A solution of 70 g. of methyl methacrylate, 130 g. of butyl acrylate, 10 g. of methacrylic acid and 5.3 g. of benzoyl peroxide in 133 g. of xylene is added slowly over a period of four hours to a solution of 55 g. of allyloxypentanol in 132 g. of xylene. The reaction mixture is stirred and heated at 80° C. during the addition and then for an additional eight hours. A solids determination shows 45% solids corresponding to 90% conversion.

The resin solution is blended with an organic solvent soluble, thermosetting melamine resin in a 6:4 weight ratio on a solids basis and baked on a steel panel for 30 minutes at 350° F. to yield a cured film with excellent gloss and flexibility.

*Example 5*

A solution of 70 g. of methyl methacrylate, 130 g. of butyl acrylate, 20 g. of methacrylic acid and 5.26 g. of benzoyl peroxide in 132 g. of xylene is added slowly over a period of four hours to a solution of 43 g. of allyloxypentanol in 131 g. of xylene. The reaction mixture is stirred and heated at 80° C. during the addition and for an additional eight hours. A solids determination shows 45% solids indicating 90% conversion. The reaction mixture is heated at 80° C. for an additional seven hours to yield 46% solids solution corresponding to 92% conversion.

The resin solution is blended with an organic solvent soluble, thermosetting melamine resin at 6:4 weight ratio on a solids basis and baked on a steel panel for 30 minutes at 350° F. to yield a cured film with good gloss and flexibility.

*Example 6*

A solution of 70 g. methyl methacrylate, 130 g. of butyl acrylate, 10 g. of methacrylic acid and 5.06 g. of benzoyl peroxide in 127 g. of xylene is added slowly over a period of four hours to a solution of 43 g. of allyloxypentanol in 126 g. of xylene. The reaction mixture is stirred and heated at 80° C. during the addition and then for an additional eight hours. A solids determination shows 39.5% solids corresponding to 99% conversion.

The resin solution is blended with an organic solvent soluble, thermosetting melamine resin in a 6:4 by weight ratio on a solids basis and baked on a steel panel at 350° F. for 30 minutes to yield a cured film with good flexibility.

Although only a few allyl glycol ethers have been illustrated in the examples, it is to be understood that other allyloxy alkanols can be substituted for those illustrated. Typical allyloxy alkanols would be those corresponding to the mono-allyl alcohol ethers of 1,2-butanediol, 1,3-butanediol, 2-ethyl hexane-1,3-diol, 2,4-pentanediol, 1,2-octanediol, 1,2-decanediol, and 1,2-octadecanediol.

The novel coating compositions of the present invention contain the novel resins described and illustrated hereinabove and an organic solvent soluble thermosetting aminoplast resin, such as urea-aldehyde resins, melamine-aldehyde resins, dicyandiamide-aldehyde resins, etc. The aldehyde most generally used is formaldehyde but other aldehydes, such as acetaldehyde, acrolein, and the like can be used. The aminoplast resins are readily available commercial products, under such trade-names as Resimene, Uformite and Melmac. The ratio of thermosetting resin to addition polymerization polymer is preferably within the limits of 5 to 60 parts thermosetting resin to 95 to 40 parts addition polymer.

Volatile solvents that can be used in formulating the coating compositions of the present invention include such solvents as aromatic hydrocarbons, such as, benzene, toluene, xylene; esters, such as butyl acetate and amyl acetate; ethers, especially ethers of glycols or diglycols.

I claim:

1. Novel resins comprising the addition polymerization products of (a) 5 to 30 parts of an allyloxyalkanol of the formula:

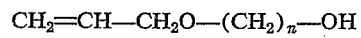
$$CH_2=CH-CH_2O-(CH_2)_n-OH$$

where n is an integer of from 2 to 20; (b) 5 to 15 parts of an acrylic monomer of the group consisting of acrylic acid and methacrylic acid, and (c) 100 parts of an acrylic type ester having the formula:

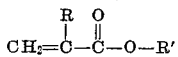

where R represents a member of the group consisting of H and $CH_3$ and R' is an alkyl group containing 1 to 8 carbon atoms.

2. Novel resins comprising the addition polymerization products of (a) 5 to 30 parts of an allyloxyalkanol of the formula:

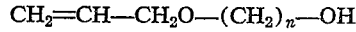
$$CH_2=CH-CH_2O-(CH_2)_n-OH$$

where n is an integer of from 2 to 20; (b) 5 to 15 parts of methacrylic acid, and (c) 100 parts of a mixture consisting of 25 to 75% of an acrylic ester having the formula:

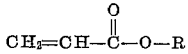

where R is an alkyl group containing 1 to 8 carbon atoms and 75 to 25% of an acrylic ester having the formula:

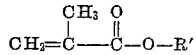

where R' is an alkyl group containing 1 to 8 carbon atoms.

3. Novel resins comprising the addition polymerization products of (a) 5 to 30 parts of allyloxyethanol, (b) 5 to 15 parts of methacrylic acid, and (c) 100 parts of a mixture consisting of 25 to 75% of butyl acrylate and 75 to 25% of methyl methacrylate.

4. The method of preparing resins which includes heating (a) 5 to 30 parts of an allyloxyalkanol of the formula:

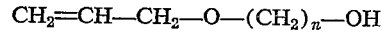
$$CH_2=CH-CH_2-O-(CH_2)_n-OH$$

where n is an integer of from 2 to 20; (b) 5 to 15 parts of an acrylic monomer of the group consisting of acrylic acid and methacrylic acid, and (c) 100 parts of acrylic type ester having the formula:

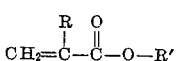

where R represents a member of the group consisting of H and $CH_3$ and R' is an alkyl group containing 1 to 8 carbon atoms, said heating being carried out in the presence of a free radical polymerization catalyst.

5. A composition of matter comprising 5 to 60 parts of an organic solvent soluble thermosetting aminoplast resin selected from the group consisting of urea-aldehyde resins, melamine-aldehyde resins, and dicyandiamide-aldehyde resins and 95 to 40 parts of a resin comprising the addition polymerization product of (a) 5 to 30 parts of allyloxyalkanol of the formula:

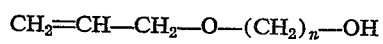
$$CH_2=CH-CH_2-O-(CH_2)_n-OH$$

where $n$ is an integer of from 2 to 20; (b) 5 to 15 parts of an acrylic monomer of the group consisting of acrylic acid and methacrylic acid, and (c) 100 parts of an acrylic type ester having the formula:

$$CH_2=\overset{R}{\underset{|}{C}}-\overset{O}{\underset{\|}{C}}-O-R'$$

where R represents a member of the group consisting of H and $CH_3$ and R' is an alkyl group containing 1 to 8 carbon atoms.

References Cited in the file of this patent

UNITED STATES PATENTS 2,444,655    Kroeker et al. _____ July 6, 1948